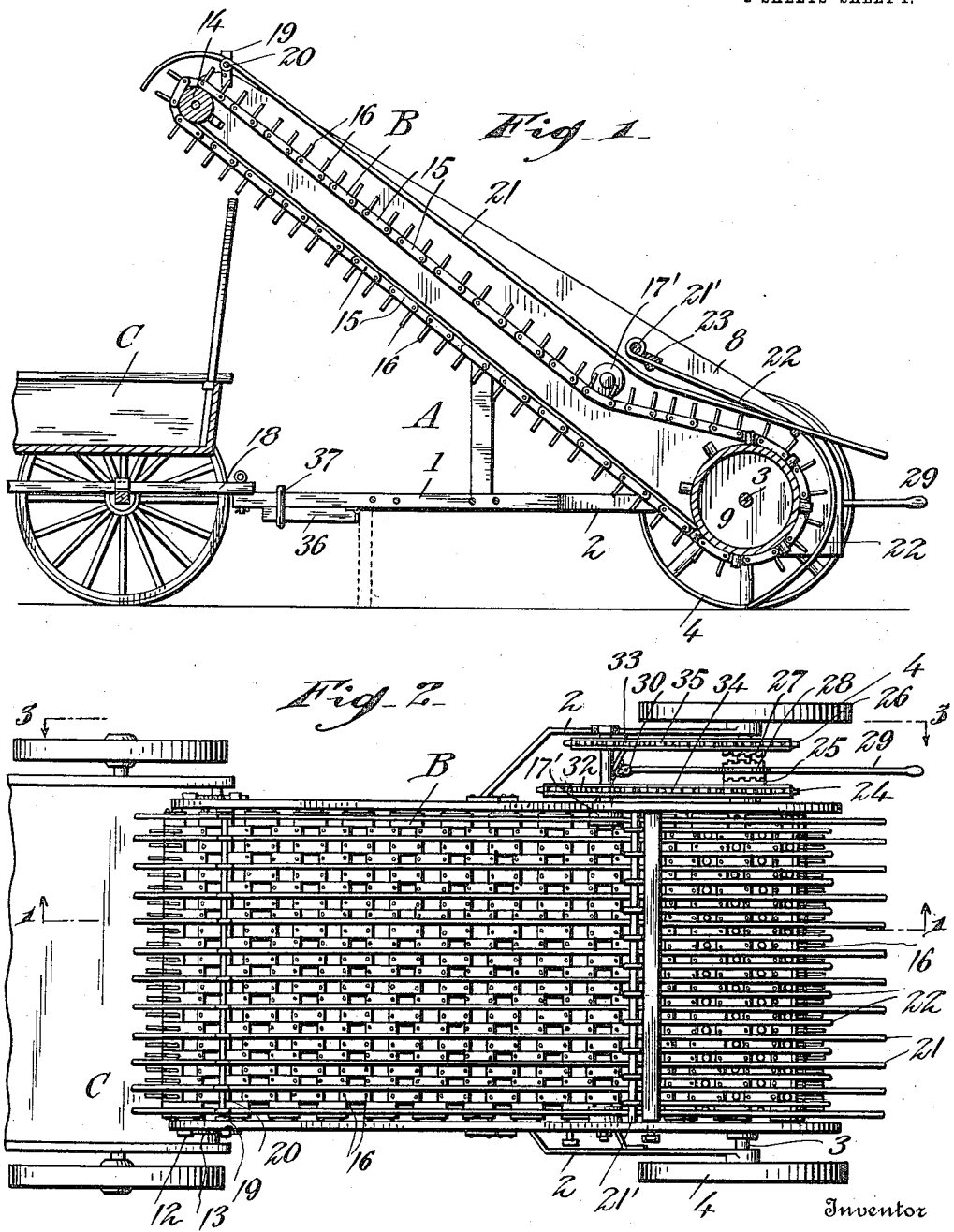

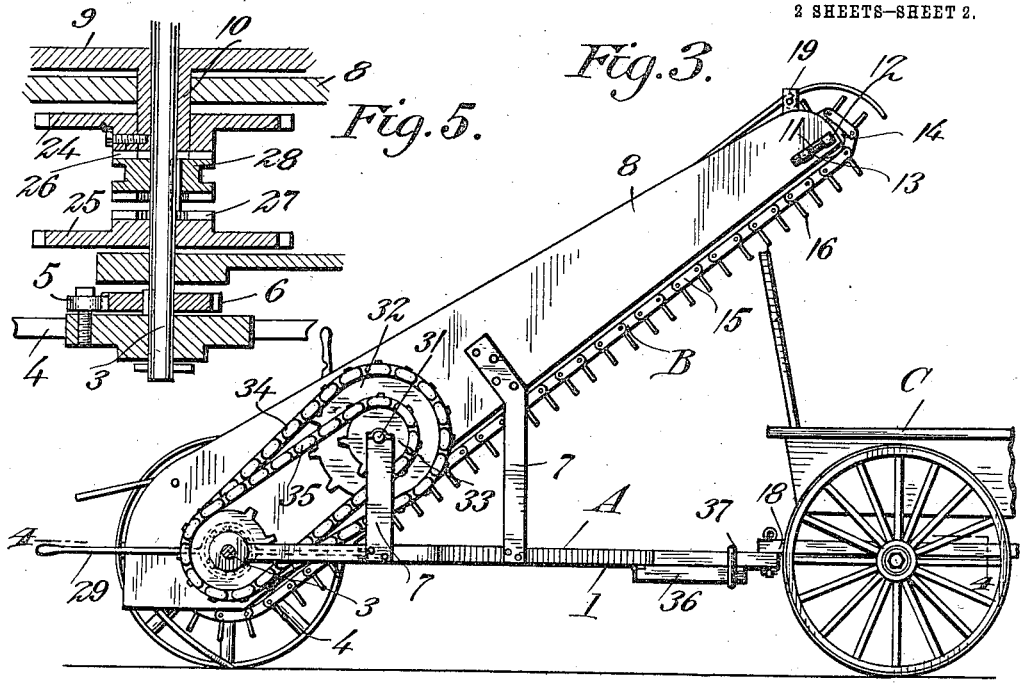
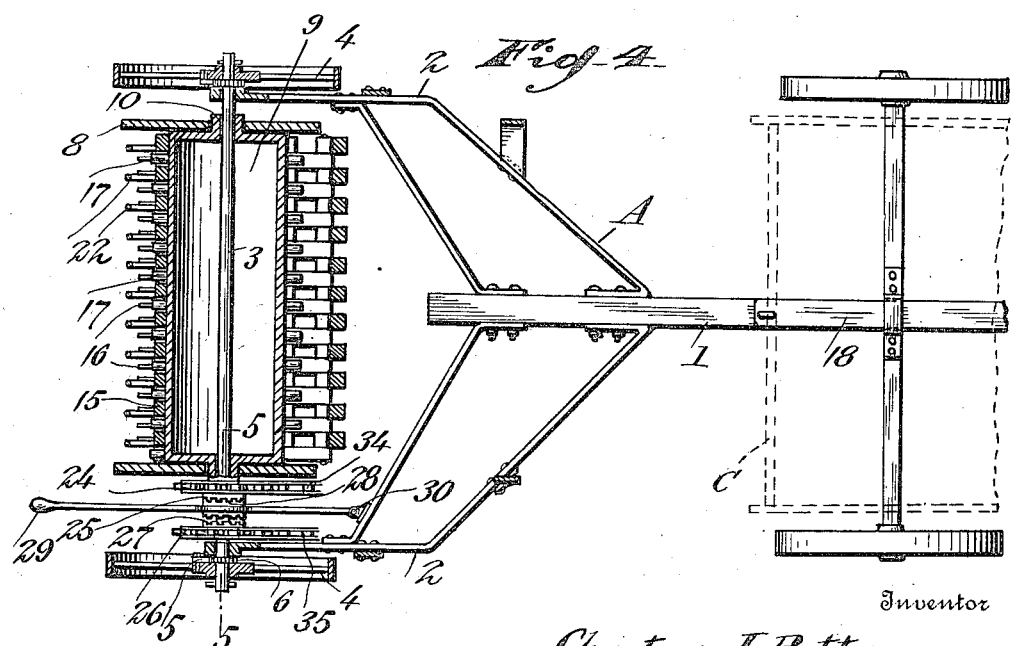

UNITED STATES PATENT OFFICE.

CHESTER J. PATTERSON, OF PHILADELPHIA, PENNSYLVANIA.

HAY-LOADER.

1,075,935.  Specification of Letters Patent.  Patented Oct. 14, 1913.

Application filed November 13, 1912. Serial No. 731,164.

*To all whom it may concern:*

Be it known that I, CHESTER J. PATTERSON, a citizen of the United States, residing at Philadelphia, in the county of Philadelphia and State of Pennsylvania, have invented new and useful Improvements in Hay-Loaders, of which the following is a specification.

This invention relates to hay loaders, and it has for its object to produce a hay loader of simple and improved construction embodying mechanism whereby the speed of the loading apparatus may be varied so as to insure efficiency of operation under varying crop conditions.

A further object of the invention is to simplify and improve the general construction and operation of the device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a longitudinal vertical sectional view of a machine constructed in accordance with the invention, taken on the line 1—1 in Fig. 2. Fig. 2 is a top plan view. Fig. 3 is a sectional elevation taken on the line 3—3 in Fig. 2. Fig. 4 is a horizontal sectional view taken on the line 4—4 in Fig. 3. Fig. 5 is a sectional detail view of the speed varying mechanism taken on the line 5—5 in Fig. 4.

Corresponding parts in the several figures are denoted by like characters of reference.

The frame A of the improved machine includes a tongue or draft member 1 and side members 2, 2, the latter affording bearings for the axle 3 having the transporting wheels 4, one of which is loose on the axle, but is equipped with a pawl or dog 5 engaging a ratchet wheel 6 associated with the axle, which latter will thus be rotated in its bearings when the machine advances over the ground.

The frame of the machine includes uprights 7 supporting the conveyer casing which includes side members 8 including between them adjacent to their lower ends a drum 9 having hubs 10 that revolve on the axle, said hubs extending through the side members 8 of the conveyer casing, as clearly seen in Fig. 4. The side members of the conveyer casing are provided adjacent to their upper ends with slots 11 to accommodate bearing members 12 which are adjustable in said slots by means of screws 13 and which afford bearings for the journals of a roller 14 over which is guided the endless conveyer B, which latter is also guided over the drum 9. The endless conveyer is composed of a link belt, the links of which 15 are provided with outwardly extending prongs 16. Some of the links or interspaces therebetween are engaged by the studs 17 on the drum 9 which thereby serves to impart motion to the conveyer. Guide rollers 17' are provided on the inner faces of the side members 8 of the conveyer casing intermediate the roller 14 and the drum 9 to engage the upper lead of the conveyer, a portion of which will thus be maintained in approximate parallel relation to the upper lead, as clearly seen in Fig. 1.

The conveyer casing is maintained in an inclined position by the frame of the machine, the forward end being elevated, as shown. When the tongue or draft bar 1 is connected with the reach bar 18 of an ordinary wagon, indicated at C, in the several figures of the drawing, the upper, forward end of the conveyer will project over the tail end of the wagon box so as to discharge into the latter. The side members 8 of the conveyer casing are provided near their upper forward ends with brackets 19 connected by a cross bar 20 on which a plurality of guard rods 21 are pivotally mounted, said guard rods having curved front ends extending forwardly of the conveyer, and said guard rods being extended downwardly and rearwardly so as to extend some distance in rear of the conveyer. The side members 8 are also connected together by a cross bar or rod 21' upon which a plurality of rake teeth 22 are mounted, said rake teeth being also extended through a cross bar 23, whereby they are held in proper position for operation. These rake teeth are curved around the drum 9, in approximate concentric relation to said drum for a portion of their lengths, as clearly seen in Fig. 1. The rake teeth 22 are also positioned intermediate the guard rods 21, the lower ends of which latter project rearwardly of the rake teeth.

Mounted on one of the hubs 10 of the drum 9 is a sprocket wheel 24 having a clutch member 25. Mounted loosely on the axle 3 is a sprocket wheel 26 having a clutch member 27 facing the clutch member 25. Mounted slidably on the axle 3 with which it is connected for rotation by means of a key or spline is a double clutch member 28 which may be engaged by a shifting lever 29 fulcrumed on the frame of the machine at 30 to place it in mesh with either one of the clutch members 25 and 27. Supported for rotation in suitable bearings at some distance from the axle 3 is a shaft 31 carrying sprocket wheels 32, 33 of different diameters, said sprocket wheels being connected with sprocket wheels 24 and 26 by means of chains or link belts 34, 35. It will be seen that when the machine progresses over the ground and the axle 3 is rotated, motion may be transmitted from the axle directly to the drum 9 by placing the clutch member 28 in mesh with the clutch member 25 of the sprocket wheel 24 carried by the drum. If it is desired to increase the speed of the conveyer, the clutch member 28 is placed in engagement with the clutch member 27 of the sprocket wheel 26 which is connected by the link belt 35 with the relatively small sprocket wheel 33 on the shaft 31 from which motion is transmitted by a link belt 34 guided over the relatively large sprocket wheel 32 to the sprocket wheel 24 associated with the drum.

The tongue 1 is provided with a prop 36 hingedly connected therewith for the purpose of supporting the frame of the machine when detached from the wagon. When not in use, the prop may be supported by means of a keeper 37.

From the foregoing description, taken in connection with the drawings hereto annexed, the operation and advantages of this invention will be readily understood.

When the machine is drawn over the field, the hay is gathered by the rake teeth and is carried by the prongs 16 projecting from the links 15 of the endless conveyer beneath the guard rods 21 and is eventually discharged over the upper end of the elevator into the box of a rack or wagon with which it is connected. The adjustable bearings 12 permit the endless conveyer to be maintained under proper tension, and the speed of the conveyer may be regulated according to the condition of the crop by simply manipulating the clutch member 28 by means of the lever 29.

Having thus described the invention, what is claimed as new, is:—

In a hay loader, a frame having a wheel carrying axle supported for rotation, a conveyer casing including inclined side members supported on the frame, a drum supported for rotation on the axle and having hubs extending through the side members of the conveyer casing, an endless conveyer guided over the drum, a sprocket wheel fixed on a hub of the drum and having a clutch member, a sprocket wheel loose on the axle and having a clutch member, a double clutch member slidable on the axle and connected for rotation therewith, means for adjusting the double clutch member to place it in engagement with one of the clutch members of the aforesaid sprocket wheels, a counter shaft supported in parallel relation to the axle and having sprocket wheels of various diameters, and link belts connecting the last mentioned sprocket wheels with the sprocket wheels on the axle and on the hub of the drum, respectively.

In testimony whereof I affix my signature in presence of two witnesses.

CHESTER J. PATTERSON.

Witnesses:
C. HUGLER,
SIMON GREENEBAUM.

---

Copies of this patent may be obtained for five cents each, by addressing the "Commissioner of Patents, Washington, D. C."